United States Patent [19]
Austin

[11] Patent Number: 6,158,124
[45] Date of Patent: *Dec. 12, 2000

[54] PRELOADING & MACHINING MOUNTED BRAKE DISC

[75] Inventor: Vince Austin, Rochester Hills, Mich.

[73] Assignee: Varga Brakes, Inc., Livonia, Mich.

[ * ] Notice: This patent is subject to a terminal disclaimer.

[21] Appl. No.: 09/193,648

[22] Filed: Nov. 17, 1998

[51] Int. Cl.[7] ...................................................... B23P 11/00
[52] U.S. Cl. .......................... 29/898.09; 82/1.11; 82/112; 188/18 R; 188/218 XL; 451/63; 451/902; 29/557; 29/434
[58] Field of Search ............................... 29/434, 898.062, 29/898.067, 898.09, 557; 188/218 XL, 18 R; 82/1.11, 112; 451/63, 290, 902

[56] References Cited

U.S. PATENT DOCUMENTS

| | | | |
|---|---|---|---|
| 3,540,165 | 11/1970 | Lanham | 51/237 |
| 3,555,940 | 1/1971 | Cooper | 82/2 |
| 4,825,596 | 5/1989 | Kinner | 51/281 SF |
| 5,159,754 | 11/1992 | Vancsik | 29/898.07 |
| 5,430,926 | 7/1995 | Hartford . | |
| 5,596,798 | 1/1997 | Hofmann et al. | 29/724 |
| 5,653,153 | 8/1997 | Greenwald | 82/1.11 |
| 5,822,859 | 10/1998 | Kessen et al. | 29/898.061 |
| 5,822,860 | 10/1998 | Wadsworth-Dubbert et al. | 29/898.061 |
| 5,842,388 | 12/1998 | Visser et al. | 82/1.11 |
| 5,899,305 | 5/1999 | Austin et al. | 188/218 XL |
| 5,915,502 | 6/1999 | Rapisardi et al. | 188/18 R |
| 5,937,499 | 8/1999 | Austin et al. | 29/434 |
| 5,988,761 | 11/1999 | Visser et al. | 301/6.1 |

*Primary Examiner*—David P. Bryant
*Assistant Examiner*—Essama Omgba
*Attorney, Agent, or Firm*—MacMillian, Sobanski & Todd, LLC

[57] ABSTRACT

A brake disc assembly including an inner hub (14) extending between a drive end (16) and a wheel end (18) and a disc flange (20) extending radially about the circumference of the inner hub (14) at the wheel end (18) with the inner hub (14) having a bore (22) extending between the ends for receiving a drive shaft. A brake disc has a base (26) attached to the disc flange (20) about the circumference of the inner hub (14) and a rotor (28) extends radially from the base (26) and presents parallel braking surfaces (30). A bearing assembly surrounds the hub (14) between the drive end (16) and the disc flange (20) for supporting the hub (14) with an outer race (32) presents a support flange (34) for attachment to a support structure (36) and an inner race member (58) is disposed about the drive end (16). The assembly is characterized by including a deformed portion (72) of the drive end (16) extending radially outwardly and axially into engagement with the bearing assembly for preloading the bearing assembly in the axial direction.

9 Claims, 4 Drawing Sheets

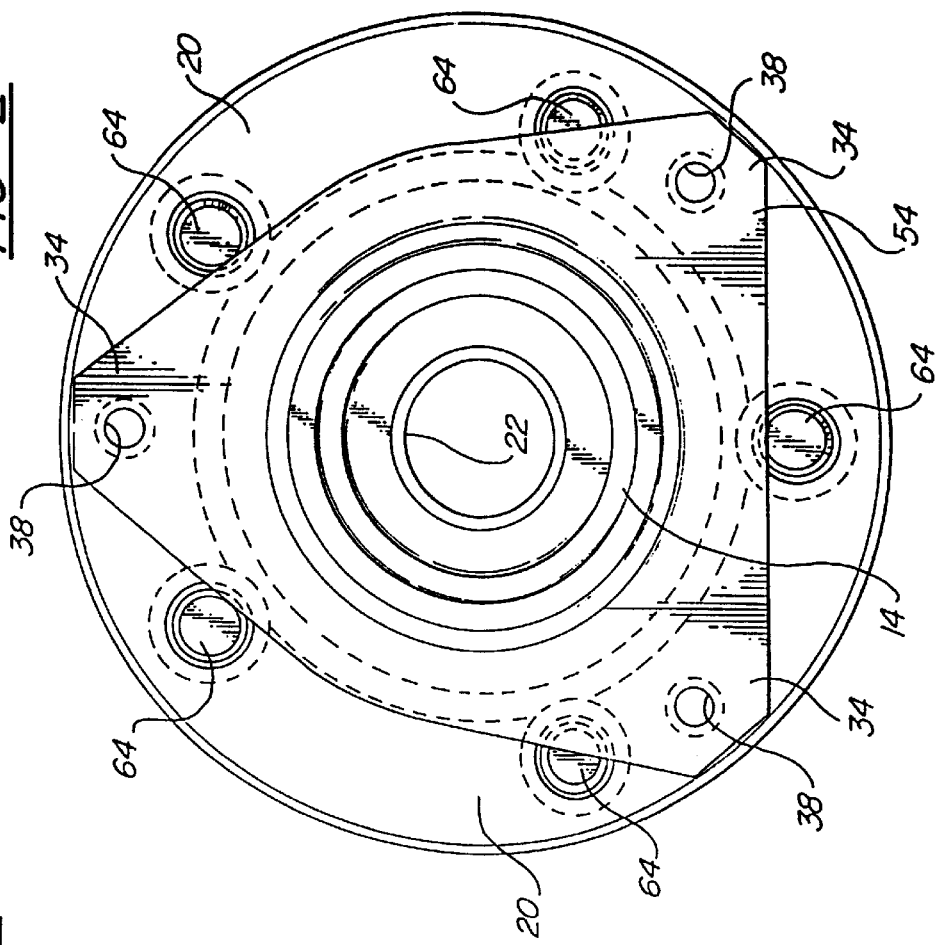
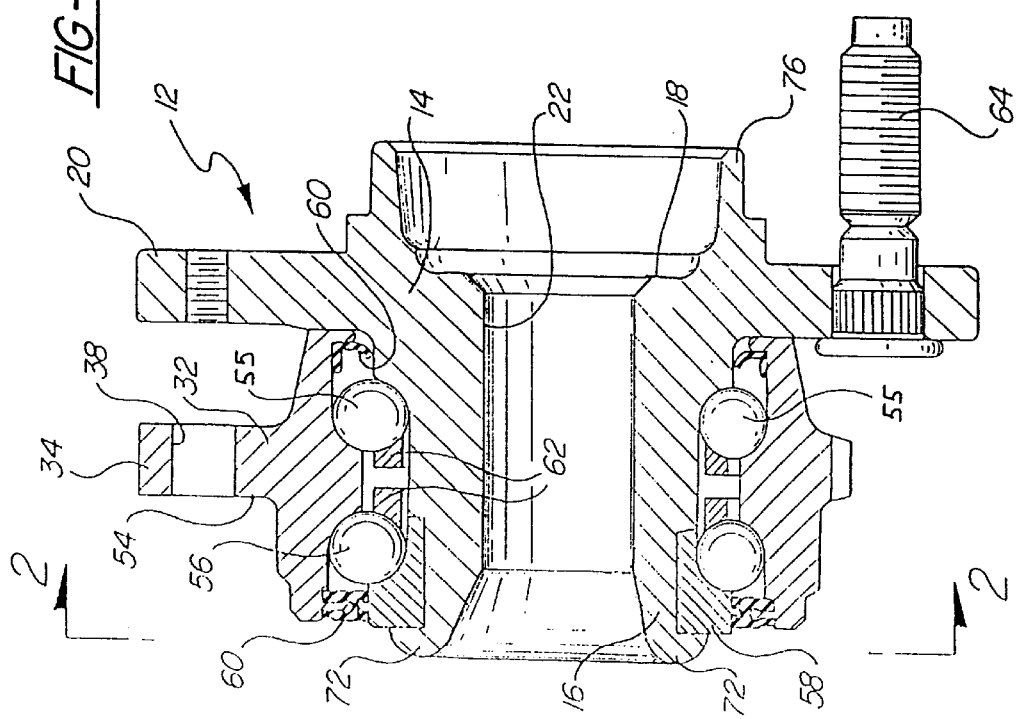

PRELOADING & MACHINING MOUNTED BRAKE DISC

BACKGROUND OF THE INVENTION

1. Field of the Invention

The subject invention relates to the disc brakes and, more specifically, to a method of fabricating the braking surfaces on the brake disc.

2. Description of the Prior Art

With the advent of front wheel drive vehicles and disc brakes, the assembly which is driven by the drive shaft comprises a hub presenting a disc flange supporting a rotor having opposed braking surfaces and with a bearing assembly surrounding the hub with an outer race presenting a support flange for attachment to a king pin of a vehicle. When fully assembled on the vehicle, the braking surfaces of the disc rotor are disposed adjacent the brake pads of the brake disc assembly and separated from engaging the braking surfaces by a brake running clearance when the brake piston is not actuated. When the brake piston is actuated, the brake pads take up the clearance and engage the braking surfaces.

In order to provide this uniform running clearance, and to avoid adverse wear of the disc when the brakes are not applied, the disc rotor must be manufactured to close tolerances with the braking surfaces oriented radially or perpendicularly to the axis of rotation of the rotor when installed. A method of machining to close tolerances on a disc which is mounted through a bearing on a fixed stub shaft is disclosed in U.S. Pat. No. 5,430,926 issued Jul. 11, 1995 to D. J. Hartford. Normally, however, in a front drive or driven wheel, a bearing assembly is disposed about the hub, rather than in the hub as in the aforementioned patent, and after the braking surfaces have been machined. As the bearing assembly is mounted to the vehicle, the bearing assembly is loaded to finalize the relationship or orientation between the braking surfaces and the axis of rotation and can result in misalignment of the braking surfaces. A method of machining a brake disc assembly which moves the art forward is disclosed and claimed in co-pending application Ser. No. 08/807,079 filed Feb. 27, 1997 in the names of Raymond C. Rapisardi and Vince J. Austin, now U.S. Pat. No. x,xxx,xxx issued (day/mo/yr), and in co-pending application Ser. No. 08/859,696 filed May 21, 1997 in the names of Glenn Kochan and Vince J. Austin, now U.S. Pat. No. x,xxx,xxx issued (day/mo/yr), and Ser. No. 08/994,904 filed Dec. 19, 1997 in the names of Glenn Kochan and Vince J. Austin, now U.S. Pat. No. x,xxx,xxx issued (day/mo/yr). However, this is yet another perfection to this new method.

SUMMARY OF THE INVENTION AND ADVANTAGES

A brake disc assembly comprising an inner hub extending between a drive end and a wheel end with a disc flange extending radially about the circumference of the inner hub at the wheel end with the inner hub having a bore extending between the ends for receiving a drive shaft. A brake disc has a base attached to the disc flange about the circumference of the inner hub and a rotor extends radially from the base and presents parallel braking surfaces. A bearing assembly surrounds the hub between the drive end and the disc flange for supporting the hub and includes an outer race presenting a support flange for attachment to a support structure and an inner race member disposed about the drive end. The assembly is characterized by including a deformed portion of the drive end extending radially outwardly and axially into engagement with the bearing assembly for preloading the bearing assembly in the axial direction.

The invention also presents a method comprising the steps of preloading the bearing assembly axially and clamping the outer race of the bearing assembly in a fixed orientation about a fixed axis, rotating the brake disc and the hub relative to the outer race about a rotation axis, and machining the braking surfaces of the rotor while rotating the hub and brake disc relative to the outer race. The preloading step is characterized by deforming an extension of the drive end of the inner hub radially outwardly and into engagement with the bearing assembly and into a deformed portion for preloading the bearing assembly in the axial direction.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a cross sectional view of the hub and bearing assembly processed in accordance with the subject invention;

FIG. 2 is a view taken substantially along line 2—2 of FIG. 1;

DETAILED DESCRIPTION OF THE PREFERRED EMBODIMENT

Figure 4:
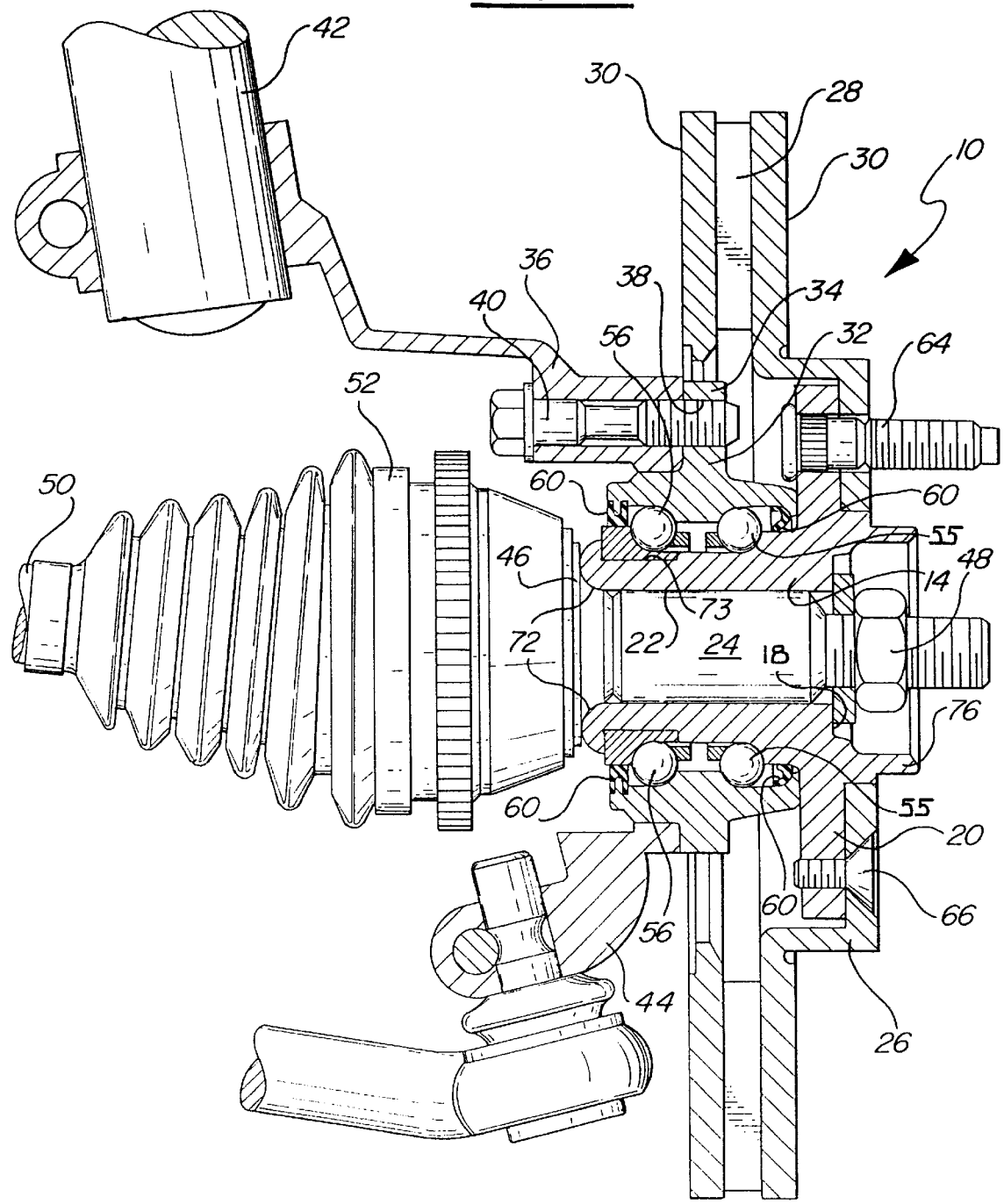
FIG. 4 is a cross sectional view of the completed assembly installed in a vehicle.
Figure 6:
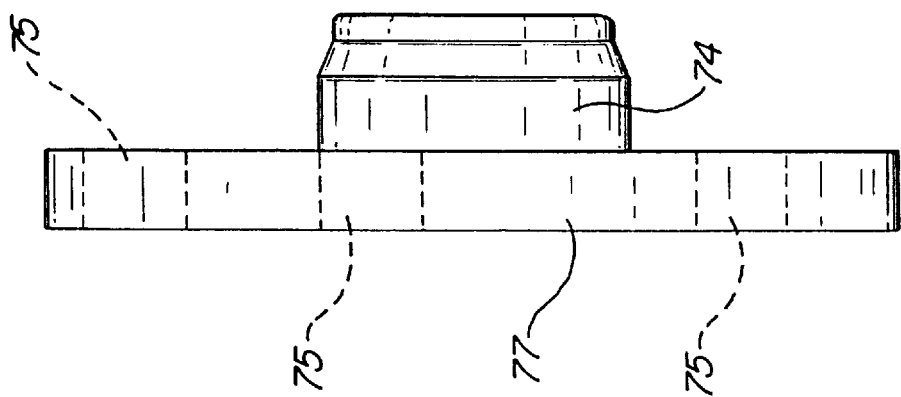
FIG. 6 is a side view of the pressure plate of FIG. 5.
Figure 5:
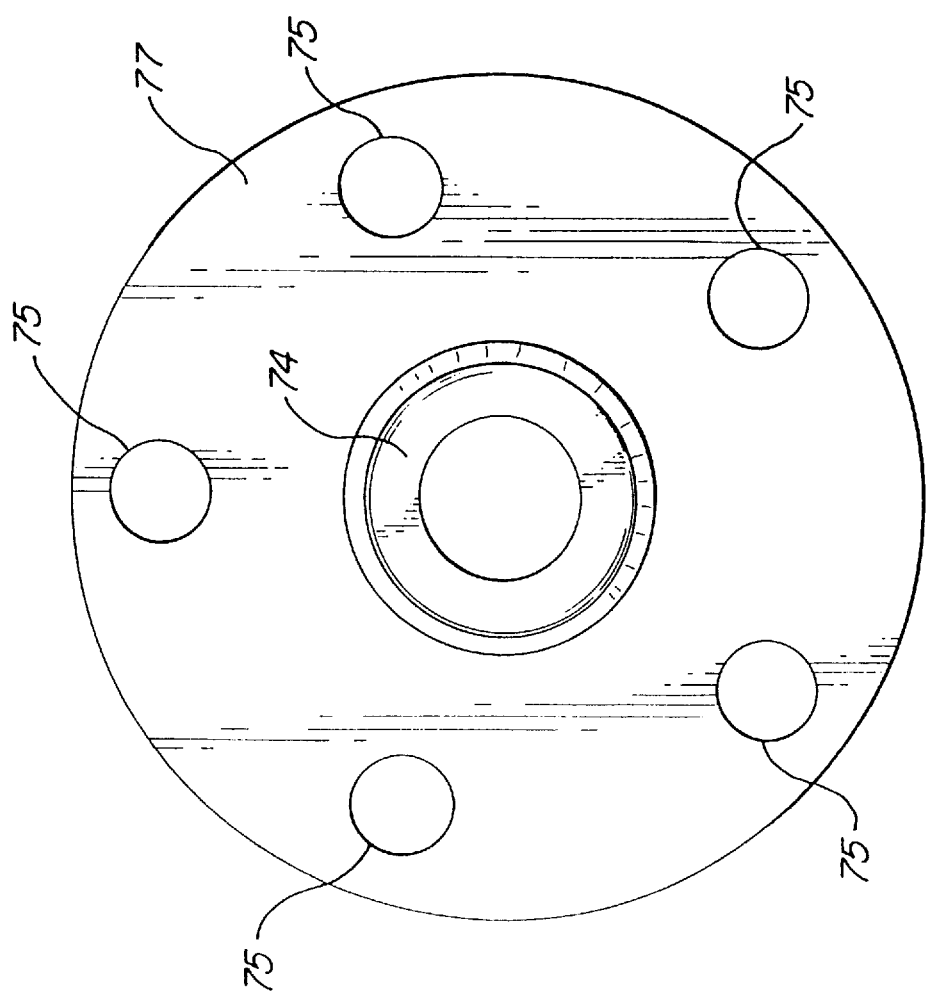
FIG. 5 is an elevational view of the pressure plate.

Referring to the Figures, wherein like numerals indicate like or corresponding parts throughout the several views, a hub and brake disc assembly manufactured in accordance with the subject invention is generally shown at 10 in FIG. 4. The assembly 10 includes a hub and bearing subassembly as generally shown at 12 in FIG. 1. The subassembly 12 comprises an inner hub 14 extending between a drive end 16 and a wheel end 18. A disc flange 20 extends radially about the circumference of the inner hub 14 at the wheel end 18. The inner hub 14 has a bore 22 extending between the ends 16 and 18 for receiving a drive shaft 24, as shown in FIG. 5. The subassembly 12 also includes a brake disc having a base 26 attached to the disc flange 20 about the circumference of the inner hub 14 and a rotor 28 extending radially from the inner hub 14 and presenting parallel braking surfaces 30. A bearing assembly surrounds the inner hub 14 between the drive end 16 and the disc flange 20 for supporting the inner hub 14. To support the inner hub 14, the bearing assembly includes an outer race 32 presenting a support flange 34 for attachment to a support structure 36. The support flange 34 is generally triangular in peripheral configuration as best shown in FIG. 2. The support flange 34 includes holes 38 at the apexes for receiving bolts 40 which, in turn, attach to the knuckle defining the support structure 36. The knuckle 36 is rotatably supported by a strut 42. A ball joint 44 connects the knuckle to the car structure. The drive shaft 24 has a head 46 in engagement with the bearing assembly and a nut/washer 48 which places the shaft 24 in tension to load the bearing assembly and to rotate the inner hub 14, which drives a wheel. The driving force is delivered through a drive axle 50 and a universal coupling, i.e., a constant velocity joint, 52, all of which is well known in the art.

The method for fabricating a brake disc assembly in accordance with the subject invention comprises various steps which may be performed in numerous different sequences.

The method of fabrication includes the step of machining a radially extending gage surface 54 on the support flange 34 of the outer race 32. This may be preceded or followed by retaining a first plurality of bearing elements 55 axially between the outer race 32 and the inner hub 14 against axial movement away from the drive end 16 and retaining a second plurality of bearing elements 56 axially between the outer race 32 and an inner race member 58 against axial movement toward the drive end 16 whereby the outer race 32 is sandwiched between the first 55 and second 56 pluralities of bearing elements and the first and second pluralities of bearing elements are preloaded between the inner race member 58 and the inner hub 14. The outer race 32 of the bearing assembly is disposed around the inner hub 14 with the gage surface 54 facing the drive end 16 of the inner hub 14. Seals 60 are positioned between each end of the bearing assembly and the inner hub 34 and race member 58 and separators or cages 62 are also disposed between the bearing elements of each respective plurality of bearing elements 55 and 56.

A plurality of wheel studs 64 are secured to the disc flange 20 to extend axially therefrom toward the wheel end 18 of the inner hub 14, the studs 64 being press fitted in holes in the disc flange 20. The studs 64 are threaded and are employed to attach a wheel to the assembly, as is well known in the art.

Another step is the attaching of the base 26 of the brake disc to the disc flange 20 with the wheel studs 64 extending through the base 26 of the brake disc. The base 26 of the brake disc is attached to the flange 20 of the inner hub 14 by screws 66.

The preloading of the bearing assembly is characterized by deforming an extension 70 (as shown in phantom in FIG. 3) of the drive end 16 of the inner hub 14 radially outwardly and into engagement with the inner race member 58 of the bearing assembly and into a deformed portion 72 for preloading the bearing assembly in the axial direction. More specifically, the preloading step is characterized by deforming the extension 70 of the drive end 16 of the inner hub 14 radially outwardly and into engagement with the inner race member 58 of the bearing assembly and into the deformed portion 72 for preloading the bearing assembly in the axial direction. This deformation is preferably performed by orbital forming whereby the metal in the extension 70 is extruded radially outwardly and over the inner race member 58. An annular recess 73 is formed with a diameter about the drive end 16 of the inner hub 14. The inner race member 58 is disposed in the annular recess 73. Thereafter, the extension 70 is deformed radially outward and axially into engagement with the inner race member 58. However, the extension 70 is formed annularly with a diameter less than the diameter of the recess 73 and the extension 70 is deformed radially outwardly of the recess and into the deformed portion 72. Accordingly, the race member 58 is secured to the inner hub 14 under a predetermined pre-load applied by the deformed portion 72.

A pressure plate 74 is disposed about the wheel end 18 and in engagement with the base 26. A plurality of wheel studs 64 are secured to the disc flange 20 to extend axially therefrom and through the pressure plate 74 to place the pressure plate 74 in circumferential driving relationship with the studs 64. A plurality of bushings 75 are press fitted into the pressure plate 74 to snugly surround each of the studs 64. The bushings 75 are of brass or rubber, which is softer than the studs 64, to prevent damage to the threads of the studs 64.

Figure 3:
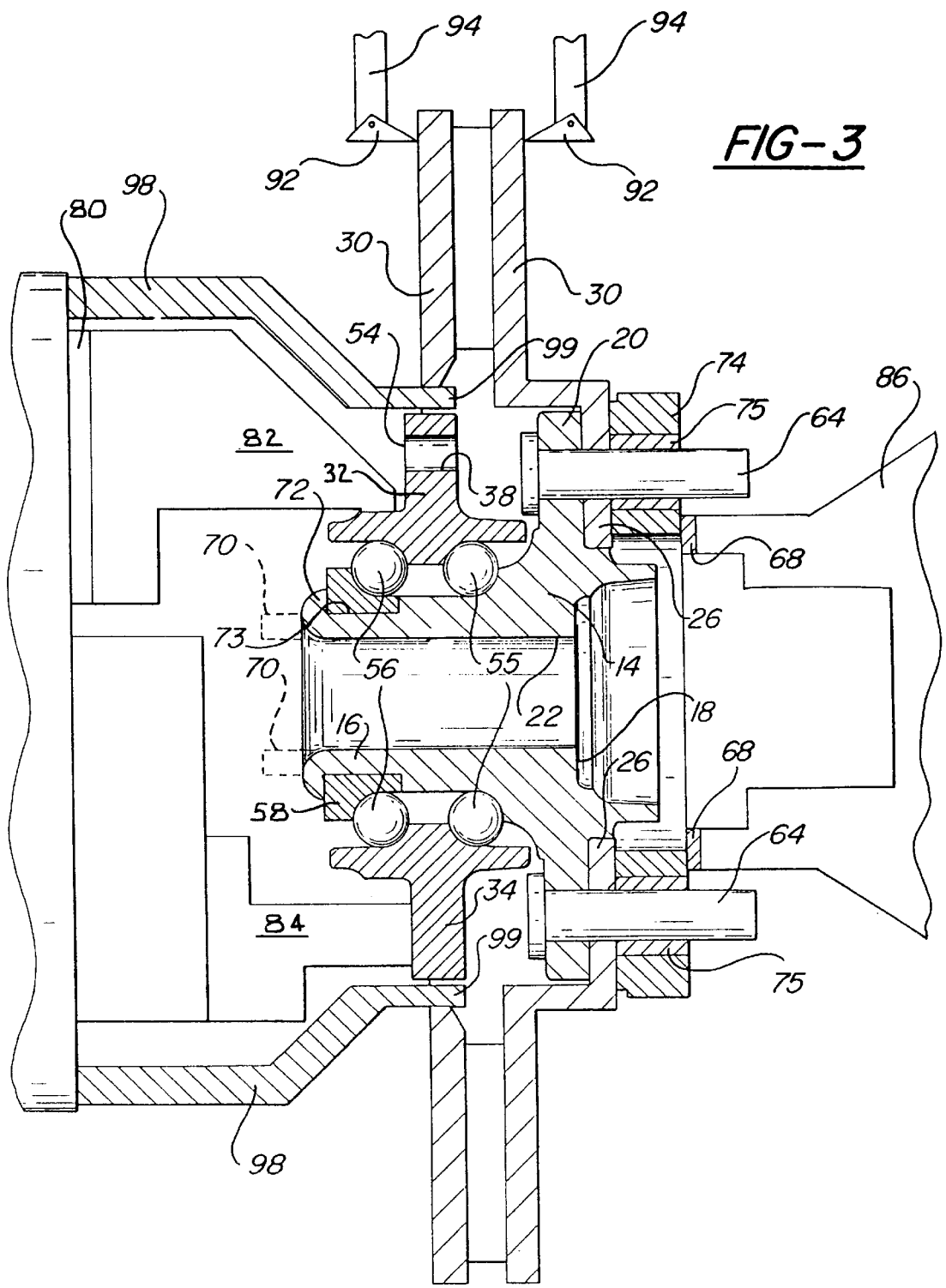
FIG. 3 is a cross sectional view of the assembly of FIG. 2 disposed in the machine for performing the machining of the disc braking surfaces.

This subassembly is moved to a machining station, as shown in FIG. 3, and placed in position to be grasped by a cam chuck 80 mounted on a stationary machine. The cam chuck 80 has three jaws 82 which clamp the outer race 32 of the bearing assembly and draws the gage surface 54 against a gage 84 to properly orient the outer race 32 about a fixed axis A. The gage 84 is shown as engaging only one area of the circumference of the gaging surface 54; however, the gage 84 may comprise three fingers engaging the circumference of the gaging surface 54 and includes air sensors to affirm that the gaging surface 54 is properly oriented and engaging the gage 84 in all sectors.

Once the outer race 32 is clamped in a fixed position relative to the fixed axis A, the next step is engaging the pressure plate 74 with a rotating member 86 to rotate the rotating member 86 about a floating axis B. More specifically, a resilient pad 68 is sandwiched between the pressure plate 74 and the rotating member 86 in a plane perpendicular to the rotation axis B and urging the rotating member 86 against the pressure plate 74 to compress the resilient pad 68 between the rotating member 86 and the pressure plate 74. Accordingly, the rotation member 86 rotates about the axis B which is floating, i.e., not fixed, to allow some relative radial movement between the outer race 32 and the inner hub 14 or brake disc. The resilient pad 68 allows relative radial movement between the rotation member 86 and the pressure plate 74 as the rotation member 86 is urged or forced axially into engagement with the resilient pad 68. The inner hub 14 is frictionally engaged by the rotating member 86 solely within the circumference of the inner hub 14 at the wheel end 18 to apply axial forces resulting from the frictional engagement through the inner hub 14 without applying axial forces to the disc flange 20 and the base 26 of the brake disc.

The final step is the machining of the braking surfaces 30 of the rotor 28 while rotating the inner hub 14 and brake disc relative to the outer race 32. This machining is accomplished with cutting inserts 92 which are supported on shafts 94 on opposite sides 30 of the disc rotor 28.

In addition, an annular plastic ring 98 is supported annularly by the chuck 80 and extending to a taper 99 in the space between the flange 34 and the disc 30 to prevent chips from the machinery from entering the bearing assembly.

Subsequent to the machining, the assembly is installed onto the knuckle as shown in FIG. 4.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A method for fabricating a brake disc assembly including an inner hub (14) extending between a drive end (16) and a wheel end (18) and a disc flange (20) extending radially about the circumference of the inner hub (14) at the wheel end (18) with the inner hub (14) having a bore (22) extending between the ends for receiving a drive shaft, a brake disc having a base (26) attached to the disc flange (20) about the circumference of the inner hub (14) and a rotor (28) extending radially from the base (26) and presenting parallel braking surfaces (30), a bearing assembly surrounding the hub (14) between the drive end (16) and the disc flange (20) for supporting the hub (14) with an outer race (32) presenting a support flange (34) for attachment to a support structure (36) and an inner race member (58) disposed about the drive end (16), said method comprising the steps of:

preloading the bearing assembly axially;

clamping the outer race (32) of the bearing assembly in a fixed orientation about a fixed axis (A);

rotating the brake disc and the hub (14) relative to the outer race (32) about a rotation axis (B); and machining the braking surfaces (30) of the rotor (28) while rotating the hub (14) and brake disc relative to the outer race (32);

said preloading step characterized by deforming an extension (70) of the drive end (16) of the inner hub (14) radially outwardly and into engagement with the bearing assembly and into a deformed portion (72) for preloading the bearing assembly in the axial direction.

2. The method as set forth in claim 1 including forming an annular recess (73) having a diameter about the drive end (16) of the inner hub (14) and disposing the inner race member (58) in the annular recess (73), and deforming the extension (70) radially outward and axially into engagement with the inner race member (58).

3. The method as set forth in claim 2 including forming the extension (70) annularly in a diameter less than the diameter of the recess (73) and deforming the extension (70) radially outwardly of the recess (73) and into the deformed portion (72).

4. The method as set forth in claim 3 including retaining a first plurality of bearing elements (55) axially between the outer race (32) and the inner hub (14) against axial movement away from the deformed portion (72) and retaining a second plurality of bearing elements (56) axially between the outer race (32) and the inner race member (58) against axial movement toward the deformed portion (72) whereby the outer race (32) is sandwiched between the first (55) and second (56) pluralities of bearing elements and the first and second pluralities of bearing elements are preloaded between the inner race member (58) and the inner hub (14).

5. The method as set forth in claim 4 wherein the rotating of the brake disc and the hub (14) is further defined by frictionally engaging the hub (14) with a rotating member (86) in a plane perpendicular to the rotation axis (B) to allow for relative radial movement between the base (26) of the brake disc and the rotating member (86) to thereby allow for relative radial movement between the brake disc and the outer race (32).

6. The method as set forth in claim 5 further defined as frictionally engaging the inner hub (14) with the rotating member (86) solely within the circumference of the inner hub (14) at the wheel end (18) to apply axial forces resulting from the frictional engagement through the inner hub (14) without applying axial forces to the disc flange (20) and the base (26) of the brake disc.

7. The method as set forth in claim 6 further defined by disposing a pressure plate (74) about the wheel end (18) and in engagement with the base (26), securing a plurality of wheel studs (64) to the disc flange (20) to extend axially therefrom and through the pressure plate (74) to place the pressure plate (74) in circumferential driving relationship with the studs (64).

8. The method as set forth in claim 7 further defined as disposing a resilient pad (68) disposed between the pressure plate (74) and the rotating member (86) for facilitating the relative radial movement between the base (26) of the brake disc and the rotating member (86).

9. The method as set forth in claim 8 including disposing a seal (98) around the outer race (32) to prevent contaminants from entering the bearing assembly during the machining.

* * * * *